W. F. NIES.
NUT LOCK.
APPLICATION FILED MAR. 28, 1919.
1,364,298.
Patented Jan. 4, 1921.
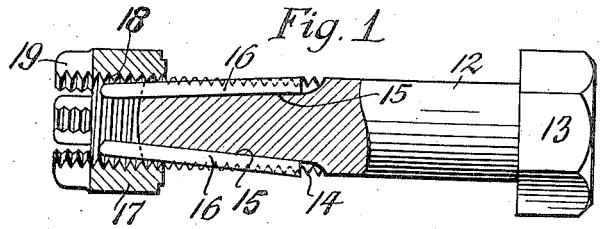
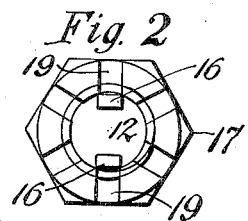
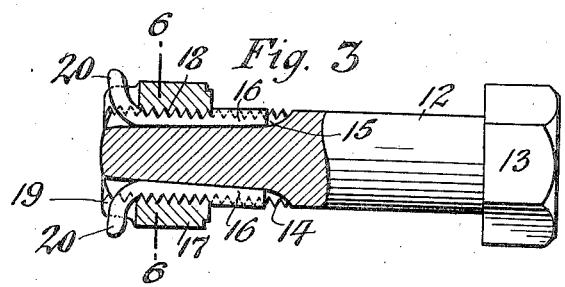
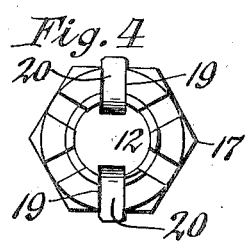
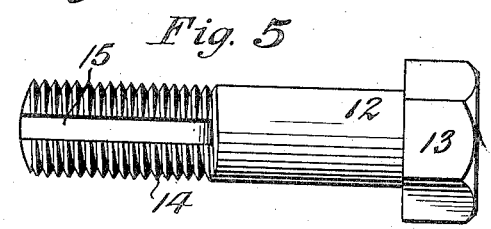
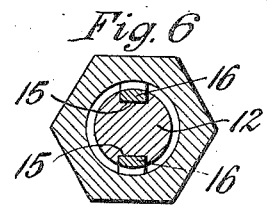
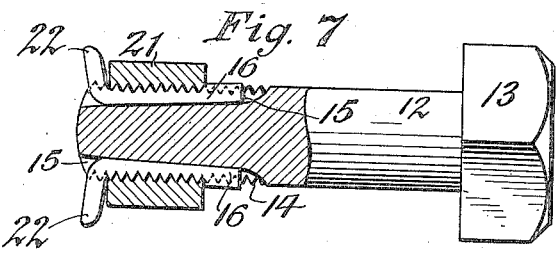
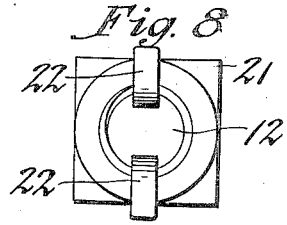
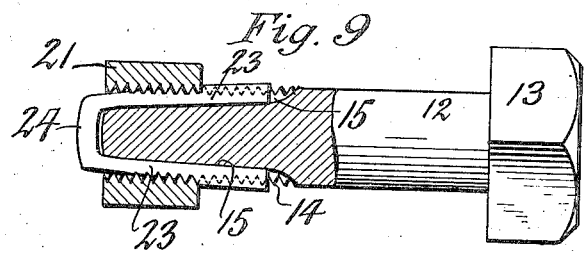
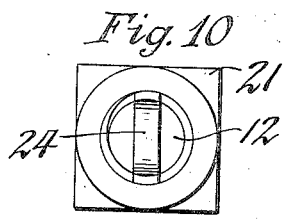
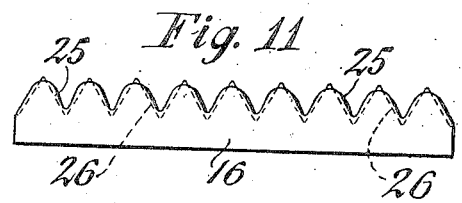
Inventor
William F. Nies
by Guper & Popp
Attorneys

UNITED STATES PATENT OFFICE.

WILLIAM F. NIES, OF ROCHESTER, NEW YORK.

NUT-LOCK.

1,364,298.  Specification of Letters Patent.  Patented Jan. 4, 1921.

Application filed March 28, 1919. Serial No. 285,780.

*To all whom it may concern:*

Be it known that I, WILLIAM F. NIES, a citizen of the United States, residing at Rochester, in the county of Monroe and State of New York, have invented new and useful Improvements in Nut-Locks, of which the following is a specification.

This invention relates to a nut lock which is designed to prevent a nut from becoming loose or lost after the same has been connected with a bolt, rod or similar member.

It is the purpose of this invention to provide a nut lock which is comparatively simple in construction and capable of being applied to the shank of a bolt, rod or similar member at comparatively low cost without requiring any change in the standard forms of either plain or castellated nuts now on the market, which can be very easily and readily operated and which will positively prevent a nut from becoming loose or lost and still permit the same to be further tightened when necessary.

In the accompanying drawings:

Figure 1 represents a longitudinal sectional elevation of one form of my improved nut lock showing a castellated nut partly engaged with the shank of a bolt preparatory to tightening and locking the same thereon. Fig. 2 is a front end elevation thereof. Fig. 3 is a sectional view similar to Fig. 1, but showing the nut tightened and locked upon the shank of the bolt. Fig. 4 is a front end elevation of the same. Fig. 5 is a plan view of the bolt shown in Figs. 1-4 with the nut and locking key omitted. Fig. 6 is a cross section taken on lines 6—6, Fig. 3. Fig. 7 is a sectional elevation of a bolt and nut locked together by my invention and showing the same in connection with a nut having a plain front face or side. Fig. 8 is a front end elevation of the same. Fig 9 is a sectional elevation of a nut and bolt locked together by a modified form of my invention. Fig. 10 is a front end elevation of the same. Fig. 11 is a diagrammatic view on an enlarged scale, showing a modification of the key embodying my invention.

Similar characters of reference refer to like parts throughout the several views.

Although my improved nut lock may be used in connection with various parts upon which a screw nut is to be held against loosening, the same is shown in the drawings applied to a bolt which is adapted to receive a screw nut but it is to be understood that this bolt is merely typical of one of the many uses to which the invention may be put, as for instance locking the nut on a screw threaded rod or similar part.

In Figs. 1-6 is shown a bolt which comprises a cylindrical shank 12 which is provided at the rear end with a head 13 and at its front end with an external screw thread 14. On its threaded front end this shank is provided with one or more longitudinal grooves, two of such grooves 15 being shown, for example, on diametrically opposite sides thereof, each of which has its bottom preferably inclined so that the front part of this groove is comparatively deep while the rear part thereof is comparatively shallow. Each of these two grooves is preferably so constructed that it intersects the several turns of the thread of the shank. In each of these grooves is arranged a longitudinal locking key 16 which is preferably of uniform thickness throughout and of the same width as the groove which receives the same so that when these parts are assembled with a driving fit or otherwise the same will not become dismembered by ordinary handling. The thickness or height of each of these keys is preferably such that when the same is arranged in its proper position within its respective groove of the shank, the front part of this key will be arranged out of line or below the path of the front turns of the thread of the shank while the rear part of this key will be in line with and extend across or intersect the path of the rear turns of this thread, as shown in Fig. 1.

17 represents the screw nut which is provided with an internal screw thread 18 adapted to engage with the thread of the bolt shank and the locking keys thereon. In this instance this nut is provided on its front side with a plurality of radial notches 19 which are arranged in an annular row forming a castellated nut of the well known and usual type.

The keys are preferably applied to the shank of the bolt so that initially they are straight and project at their front ends beyond the front end of the bolt shank, as shown in Fig. 1. While the parts are in this position the nut may be freely slipped over the front ends of the keys and engage easily with the first few turns of the thread of the bolt shank by a forward turning movement of the nut relative to this shank, the partial assembling of the parts being represented in Fig. 1. Upon now screwing the nut forwardly on the bolt shank so that the thread of the nut engages with the rear turns of the thread on the bolt shank, the rear parts of the keys will be engaged by the thread of the nut in such manner that the thread of the nut cuts or forms thread sections on the rear parts of the keys which intersect the thread of the bolt shank, as shown in Fig. 3. This is preferably accomplished by making the locking keys of a metal or other material which is somewhat softer than the metal of which the nut and the bolt shank is made. After the nut has been turned forwardly sufficiently to cause the same and the head of the bolt to be drawn properly against opposite sides of the parts which are to be connected and the thread of the nut has embedded itself a sufficient extent in the metal of the keys, all looseness between these parts is taken up and the same will interlock frictionally with sufficient grip to prevent loosening or separation of the same while in use. In order, however, to further guard against accidental loosening of the nut on the bolt shank the front or outer ends of both keys are turned laterally outwardly into the form of lugs 20 which latter are engaged with a pair of corresponding notches on the front side of the castellated nut, as shown in Figs. 3 and 4, thereby positively preventing backward rotation of the nut and bolt relatively to each other, and reliably connecting the parts which are secured together thereby.

If the shank of the bolt should stretch or the opposing faces of the nut and the bolt head should become worn and necessitate taking up any looseness between the same, this can be readily accomplished by first straightening out the front ends of the locking keys, then further turning the screw nut on the bolt shank until these parts are tight, and then again bending the front ends of the locking keys outwardly into engagement with an adjacent pair of notches on the front side of the nut. When it is desired to remove the nut from the bolt shank this can be readily done by simply straightening out the front ends of the keys, thereby clearing the way for completely unscrewing the nut from the bolt shank.

If desired, an ordinary screw nut 21 having a plain front side or face may be employed, as shown in Figs. 7 and 8, in which case the front ends of the keys may be turned laterally in the form of lugs 22 against the front side of this nut which operates to prevent the latter from unscrewing after the thread of the nut has embedded itself in the metal of the locking keys by cutting thread sections thereon.

Instead of forming the two keys of two individual pieces the key as a whole may be constructed in the form of a U-shaped staple, the legs 23 of which may form two longitudinal key sections which engage with opposite longitudinal grooves in the threaded portion of the bolt shank while the cross bar 24 of this staple extends across the front end of the bolt shank, as shown in Figs. 9 and 10.

If desired the outer side of each key may be provided with partially formed or elementary thread sections 25 as shown in Fig. 11, so that when this side of the key is engaged by the thread of the screw nut the metal of the key may be more readily displaced by the thread of the nut and thus render the operation of applying a nut to a bolt shank much easier. The finished or altered form of the thread surface which would be produced upon this key by the cutting action of the thread of a nut is represented by dotted lines 26 in Fig. 11.

Obviously the number of keys which may be used for locking a nut on a shank may be varied according to the particular installation and a single one may answer every purpose in some instances while in large work more than two keys may be employed.

This nut lock is not only very simple in construction but the same can also be manufactured at comparatively low cost, and it permits of assembling the nut and bolt shank as well as dismembering the same easily and quickly by the use of the usual tools now employed for this purpose.

I claim as my invention:

A nut lock comprising a shank having an external screw thread and a longitudinal groove intersecting the turns of said thread, a key arranged in said groove and having a portion thereof extending across the path of the thread on said shank, and a screw nut having an internal thread which is adapted to engage the thread of said shank and form a thread on that part of said key which is arranged in the path of the thread on said shank, said key having its outer surface which is engaged by the thread of said nut provided initially with partially formed thread sections.

WILLIAM F. NIES.